US010400902B2

(12) United States Patent
Miyazoe et al.

(10) Patent No.: US 10,400,902 B2
(45) Date of Patent: Sep. 3, 2019

(54) SPOOL VALVE

(71) Applicant: SMC CORPORATION, Chiyoda-ku (JP)

(72) Inventors: Shinji Miyazoe, Moriya (JP); Kazuhiro Noguchi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/762,220

(22) PCT Filed: Oct. 4, 2016

(86) PCT No.: PCT/JP2016/079383
§ 371 (c)(1),
(2) Date: Mar. 22, 2018

(87) PCT Pub. No.: WO2017/061400
PCT Pub. Date: Apr. 13, 2017

(65) Prior Publication Data
US 2018/0274687 A1    Sep. 27, 2018

(30) Foreign Application Priority Data

Oct. 5, 2015 (JP) ................................. 2015-197931

(51) Int. Cl.
*F16K 11/07* (2006.01)
*F16K 11/065* (2006.01)
*F16K 31/42* (2006.01)

(52) U.S. Cl.
CPC ............ *F16K 11/07* (2013.01); *F16K 11/065* (2013.01); *F16K 31/423* (2013.01); *F16K 31/426* (2013.01)

(58) Field of Classification Search
CPC ...... F16K 11/07; F16K 11/065; F16K 31/423; F16K 31/426; Y10T 137/8671;
(Continued)

(56) References Cited

U.S. PATENT DOCUMENTS 5,996,629 A     12/1999   Sato et al.
6,386,229 B1 *   5/2002   Morikawa ............. F15B 19/005
                                                                   137/552

(Continued)

FOREIGN PATENT DOCUMENTS

JP      7-119851 A     5/1995
JP      9-273651 A    10/1997
JP     2013-83323 A    5/2013

*Primary Examiner* — Kevin F Murphy
*Assistant Examiner* — Kelsey E Cary
(74) *Attorney, Agent, or Firm* — Oblon, McClelland, Maier & Neustadt, L.L.P.

(57) ABSTRACT

The cross-sectional shape of a valve hole is an elongated shape having a long axis and a short axis, and has left and right hole side walls that are parallel to each other, a first hole end wall that connects one ends of the left and right hole side walls, and a second hole end wall that connects the other ends of the left and right hole side walls, and the cross-sectional shape of land portions of a spool is an elongated shape having a long axis and a short axis, and has left and right land side walls that are parallel to each other, a first land end wall that connects one ends of the left and right land side walls, and a second land end wall that connects the other ends of the left and right land side walls.

12 Claims, 8 Drawing Sheets

(58) Field of Classification Search
CPC ..... Y10T 137/86582; Y10T 137/87193; Y10T 137/8667; Y10T 137/86574
USPC ... 137/625.69, 625.6, 596.14, 625.25, 625.2, 137/625.34
See application file for complete search history.

(56) References Cited

U.S. PATENT DOCUMENTS

| | | | |
|---|---|---|---|
| 7,591,280 B2* | 9/2009 | Narita | F15B 13/0814 137/269 |
| 8,015,991 B2* | 9/2011 | Kaitsuka | F15B 13/0892 137/269 |
| 2013/0019958 A1* | 1/2013 | Miyazoe | F16K 11/02 137/115.1 |

* cited by examiner

SPOOL VALVE

TECHNICAL FIELD

The present invention relates to a spool valve in which flow paths between a plurality of ports are opened and closed by a spool sliding in a valve hole.

BACKGROUND ART

Figure 10:
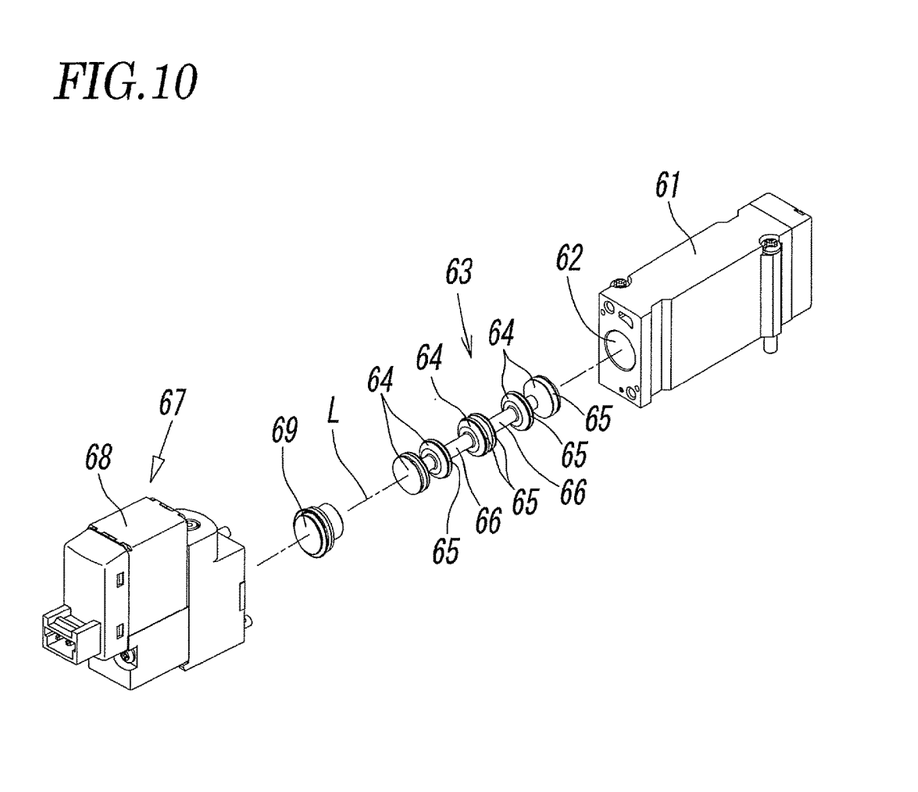
FIG. 10 is an exploded perspective view of a known spool valve.
Figure 11:
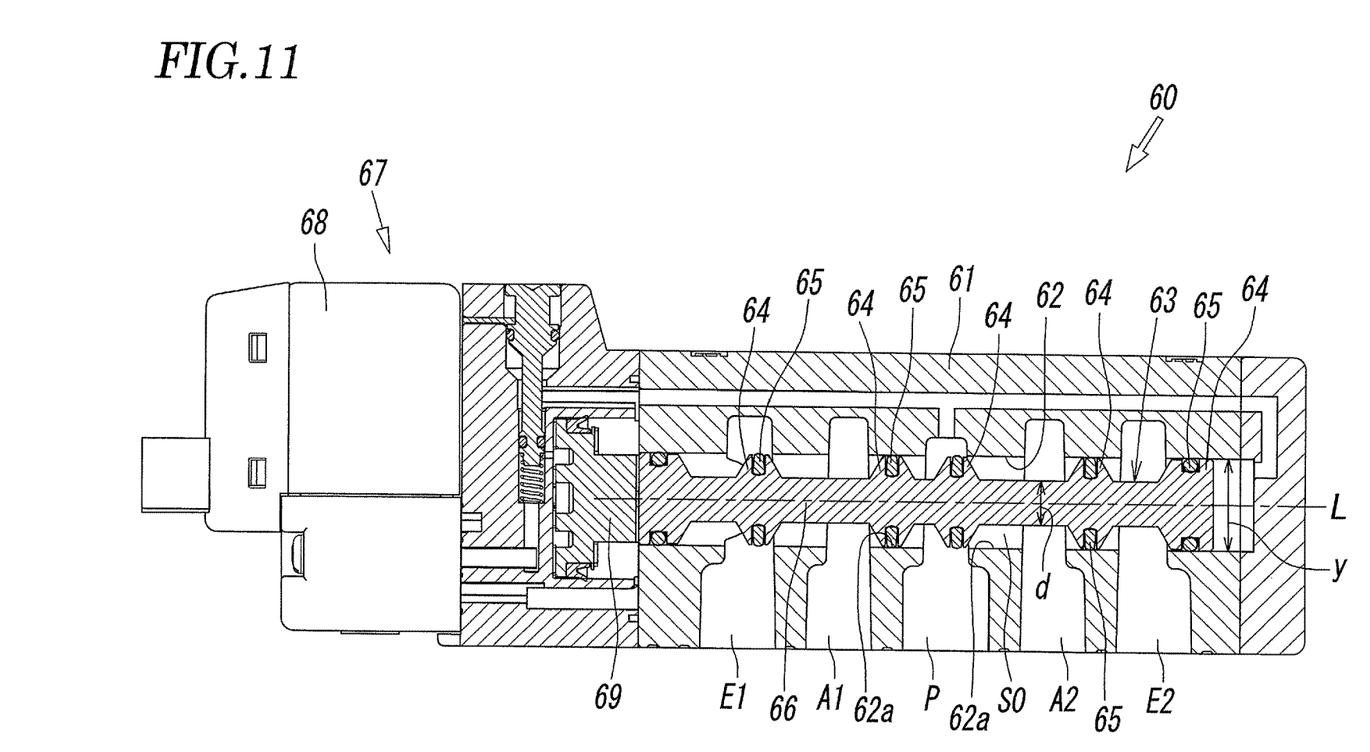
FIG. 11 is a sectional view of the known spool valve in an assembled state.

A spool valve in which flow paths between a plurality of ports are opened and closed by a spool sliding in a valve hole is well known as disclosed in, for example, Patent Literature 1. As shown in FIGS. 10 and 11, a conventional general spool valve 60 has, in a housing 61 having a plurality of ports P, A1, A2, E1, and E2, a valve hole 62 having a circular cross-section and communicating with the ports P, A1, A2, E1, and E2, and is configured such that a spool 63 is accommodated in the valve hole 62 so as to be slidable in the direction of the axis L, a pilot valve portion 67 is provided at the end portion of the housing 61, the pilot valve portion 67 is provided with a pilot piston 69 and a pilot valve 68 that causes a pilot fluid to act on the pilot piston 69, and the spool 63 is switched by the pilot valve 68 via the pilot piston 69.

The spool 63 has land portions 64 that have a circular cross-section and to the outer peripheries of which seal members 65 are attached, and shaft portions 66 that have a circular cross-section and a smaller diameter than the land portions 64 and that connects the adjacent land portions 64, and slides in the valve hole 62 so that the land portions 64 ride on valve seat portions 62a formed in parts of the valve hole 62 and separate from the valve seat portions 62a, and thereby opens and closes flow paths connecting the adjacent ports P, A1, A2, E1, and E2.

In such a spool valve, in order to increase the flow rate of the controllable pressure fluid, it is necessary to increase the effective cross-sectional area of the flow paths. Examples of methods therefor include increasing the diameter of the valve hole 62 and the spool 63 (land portions 64), and increasing the stroke of the spool 63 and the opening width of the ports P, A1, A2, E1, and E2.

Among them, the former method in which the diameter of the valve hole 62 and the spool 63 is increased can easily and reliably increase the effective cross-sectional area of the flow paths, but along with this, the lateral width of the housing 61, that is, the valve width is increased, which leads to an increase in the size of the spool valve. This method is not preferable under circumstances requiring a spool valve whose size is as small as possible and whose flow rate as high as possible.

On the other hand, the method in which the stroke of the spool 63 and the opening width of the ports P, A1, A2, E1, and E2 are increased has an advantage that it is not necessary to increase the lateral width of the housing 61, which hardly leads to an increase in size of the spool valve. However, since the diameter of the valve hole 62 and the spool 63 are unchanged, the cross-sectional area of the flow paths around the shaft portions 66 of the spool 63, that is, the cross-sectional area S0 of the flow paths between the inner periphery of the valve hole 62 and the outer peripheries of the shaft portions 66 is not increased. Therefore, it is inevitable to be largely restricted by the cross-sectional area of the flow path around the shaft portions, and it has been difficult to greatly increase the effective cross-sectional area of the entire flow path.

CITATION LIST

Patent literature

Patent Literature 1: Japanese Registered Utility Model No. 2606483

SUMMARY OF INVENTION

Technical Problem

It is a technical object of the present invention to provide a spool valve that is compact and has a rational design structure and in which, as compared with a known spool valve whose valve hole and spool have a circular cross-sectional shape, the cross-sectional area of the valve hole is increased without increasing the valve width, the cross-sectional area of the flow paths between the valve hole and the shaft portions of the spool is thereby increased, and the effective cross-sectional area of the entire flow path is thereby efficiently increased.

Solution to Problem

To solve the above problems, the spool valve of the present invention includes a main valve portion including a housing having a length direction, a width direction, and a height direction, a valve hole extending inside the housing in the length direction of the housing, ports for input, output, and discharge formed in the housing so as to communicate with the valve hole, and a spool slidably inserted in the valve hole in the direction of the axis of the valve hole; and a pilot valve portion that applies a propulsive force in one direction and a return force in the opposite direction due to pilot fluid to the spool.

The cross-sectional shape of the valve hole in a direction perpendicular to the axis is an elongated shape having a long axis oriented in the height direction of the housing and a short axis oriented in the width direction of the housing, and has left and right hole side walls that linearly extend in the long axis direction and are parallel to each other, a first hole end wall that connects one ends of the left and right hole side walls, and a second hole end wall that connects the other ends of the left and right hole side walls. The spool has land portions that open and close the flow paths, and shaft portions connecting adjacent land portions with each other and having a diameter smaller than the land portions, and the cross-sectional shape of the land portions in a direction perpendicular to the axis is an elongated shape having a long axis oriented in the height direction of the housing and a short axis oriented in the width direction of the housing, is the same shape and size as the cross-sectional shape of the valve hole, and has left and right land side walls that linearly extend in the long axis direction and are parallel to each other, a first land end wall that connects one ends of the left and right land side walls, and a second land end wall that connects the other ends of the left and right land side walls.

In the present invention, the pilot valve portion has a pilot piston that applies propulsive force to the spool and an electromagnetic pilot valve that causes a pilot fluid to act on the pilot piston, and the cross-sectional shape of the pilot piston in a direction perpendicular to the axis is an elongated shape having a long axis oriented in the height direction of the housing and a short axis oriented in the width direction of the housing, and has left and right piston side walls that linearly extend in the long axis direction and are parallel to each other, a first piston end wall that connects one ends of the left and right piston side walls, and a second piston end wall that connects the other ends of the left and right piston side walls In this case, it is preferable that the diameter in the long axis direction of the pilot piston be larger than the diameter in the long axis direction of the land portions of the spool, and the diameter in the short axis direction of the pilot piston be equal to the diameter in the short axis direction of the land portions.

In the present invention, the cross-sectional shape of the shaft portions in a direction perpendicular to the axis is a circular shape or an elongated shape having a long axis oriented in the height direction of the housing and a short axis oriented in the width direction of the housing.

According to one aspect of the present invention, the first hole end wall and the second hole end wall of the valve hole and the first land end wall and the second land end wall of the land portions each have a semicircular shape, and their respective curvature radii are equal to each other.

According to another aspect of the present invention, the first hole end wall and the second hole end wall of the valve hole and the first land end wall and the second land end wall of the land portions are composed of a straight portion perpendicular to the hole side walls of the valve hole and the land side walls of the land portions and circular arc-shaped corner portions that smoothly connect the straight portion to ends of the hole side walls and the land side walls.

According to the present invention, a manifold valve in which a plurality of spool valves having the same valve width are mounted on one manifold is formed, and at least one of the plurality of spool valves is the spool valve according to the present invention.

Advantageous Effects of Invention

In the spool valve of the present invention, the cross-sectional shape of the valve hole and the land portions of the spool is formed in an elongated shape having a long axis in the height direction of the housing. Therefore, as compared with a known spool valve whose valve hole and spool have a circular cross-sectional shape, the cross-sectional area of the valve hole can be increased without increasing the valve width, and the cross-sectional area of the flow paths between the valve hole and the shaft portions of the spool can be increased. As a result, it is possible to increase the effective cross-sectional area of the entire flow path greatly and efficiently.

DESCRIPTION OF EMBODIMENTS

FIGS. 1 to 4 show a first embodiment of a spool valve according to the present invention. The spool valve 1A is a single pilot type spool valve having one pilot valve 4, and includes a main valve portion 2 having a valve structure as a 5-port valve, and a pilot valve portion 3 provided at one end in the longitudinal direction of the main valve portion 2. The pressure fluid controlled by the spool valve 1A is compressed air.

Figure 1:
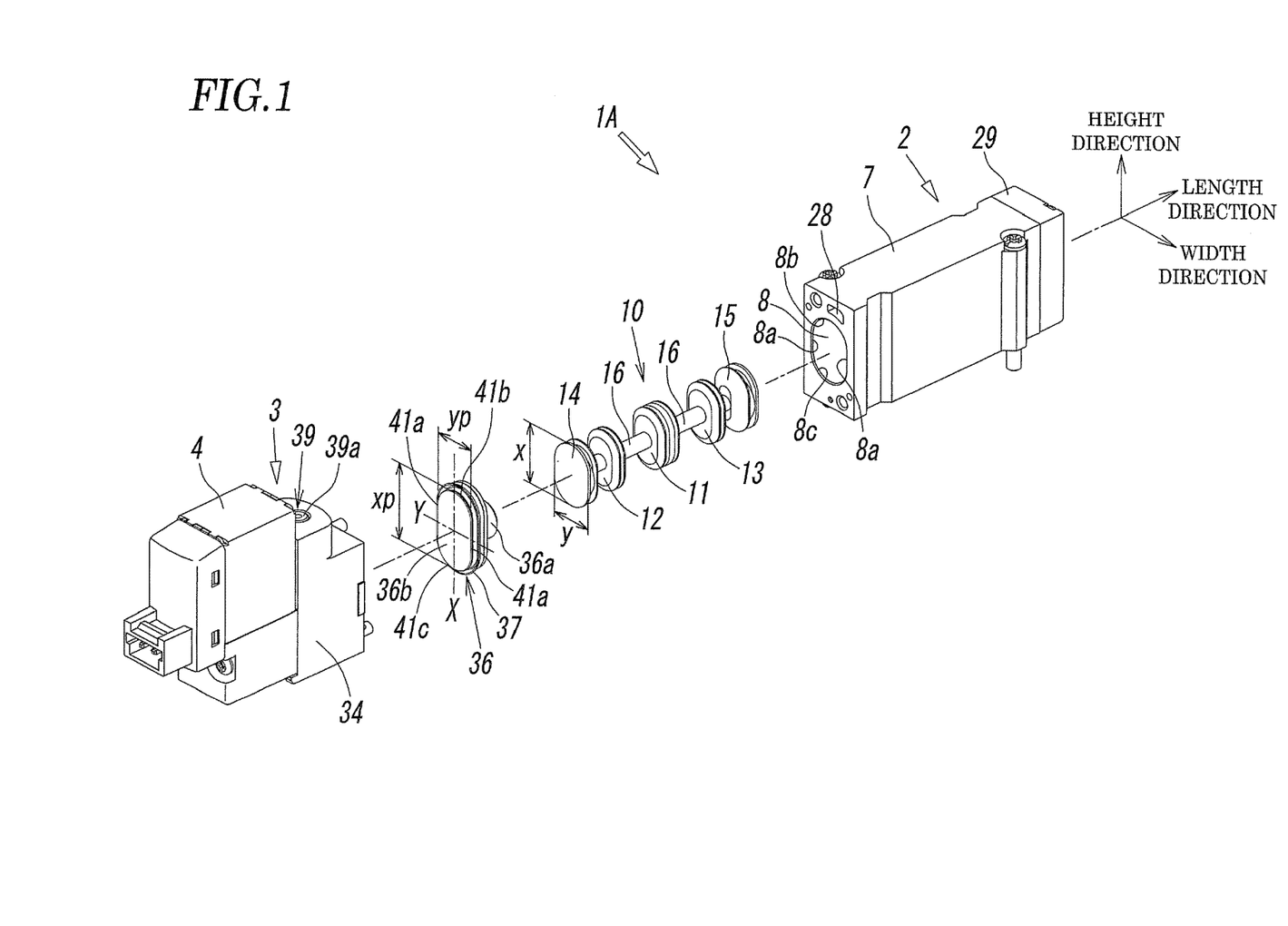
FIG. 1 is an exploded perspective view of a spool valve according to a first embodiment.

The housing 7 of the main valve portion 2 has a rectangular block shape having a length direction, a width direction, and a height direction, and in the lower surface thereof, five ports P, A1, A2, E1, and E2 for input, output, and discharge are formed side by side in the length direction of the housing 7. The arrangement of the five ports is such that the first and second output ports A1 and A2 are located on both sides of the central input port P, and the first and second discharge ports E1 and E2 are located on both outer sides of the first and second output ports A1 and A2.

Figure 3:
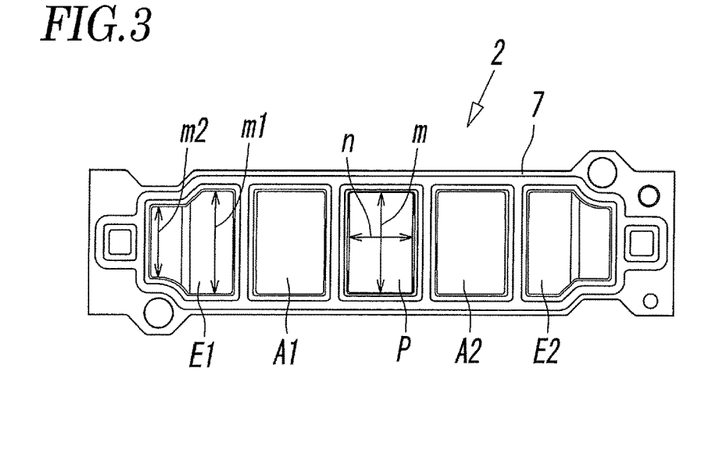
FIG. 3 is a bottom view of the main valve portion of FIG. 2.

As shown in FIG. 3, the front view shape of the input port P and the output ports A1 and A2 is a rectangular shape elongated in the width direction of the housing 7, and the opening width m of the ports P, A1, and A2 in the width direction of the housing 7 is larger than the opening width n in the length direction. On the other hand, the discharge ports E1 and E2 have substantially the shape of Japanese kanji character "totsu" in front view, and one half of the ports E1 and E2 on the side of the output ports A1 and A2 and the other half on the opposite side differ in the opening width in the width direction of the housing 7, and the opening width m1 of the one half is larger than the opening width m2 of the other half.

Figure 4:
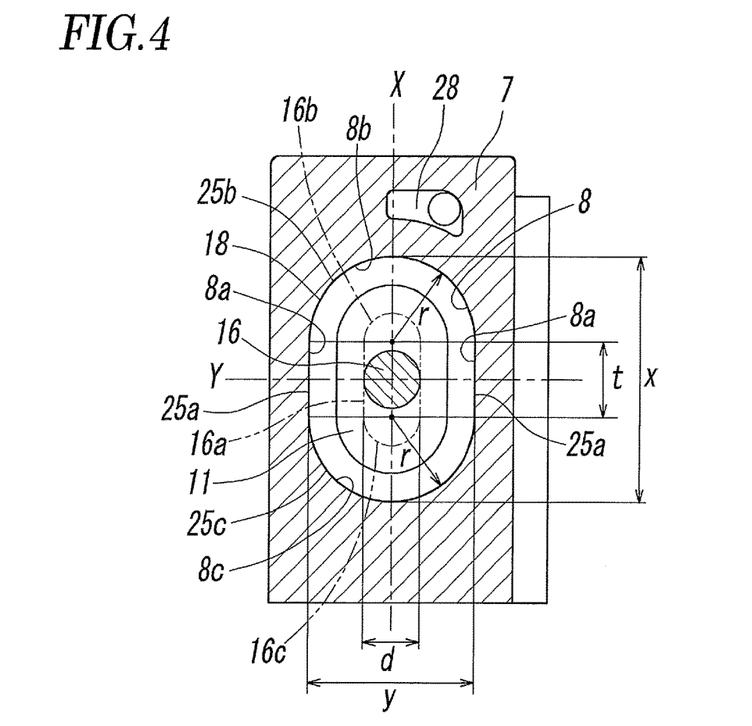
FIG. 4 is an enlarged sectional view taken along line IV-IV of FIG. 2.

A valve hole 8 communicating with the five ports P, A1, A2, E1, and E2 is formed in the housing 7 so as to penetrate the housing 7 in the longitudinal direction. As shown in FIG. 4, the cross-sectional shape of the valve hole 8 in a direction perpendicular to the axis L is a track shape elongated in the height direction of the housing 7. That is, the valve hole 8 has an elongated shape having a long axis X oriented in the height direction of the housing 7 and a short axis Y oriented in the width direction of the housing 7, and is surrounded by left and right hole side walls 8a, 8a that linearly extend in the long axis X direction and are parallel to each other, an upper first hole end wall 8b that connects one ends of the left and right hole side walls 8a, 8a, and a lower second hole end wall 8c that connects the other ends of the left and right hole side walls 8a, 8a. The first hole end wall 8b and the second hole end wall 8c each have a semicircular shape, and their respective curvature radii r are equal to each other.

The inside diameter of the valve hole 8 is increased at positions where the ports P, A1, A2, E1, and E2 communicate, and is configured such that when the seal members 18 to 21 of the spool 10, which will be described later, separate from the valve hole 8 to open the flow paths, the seal members 18 to 21 are located within the enlarged portions of the valve hole 8, that is, within the enlarged portions 8A.

In the illustrated example, the lengths t in the long axis X direction of the left and right hole side walls 8a, 8a which form straight lines are equal to each other and smaller than the diameter y of the valve hole 8 in the short axis Y direction. However, the lengths t may be equal to or larger than the diameter y in the short axis Y direction.

Figure 2:
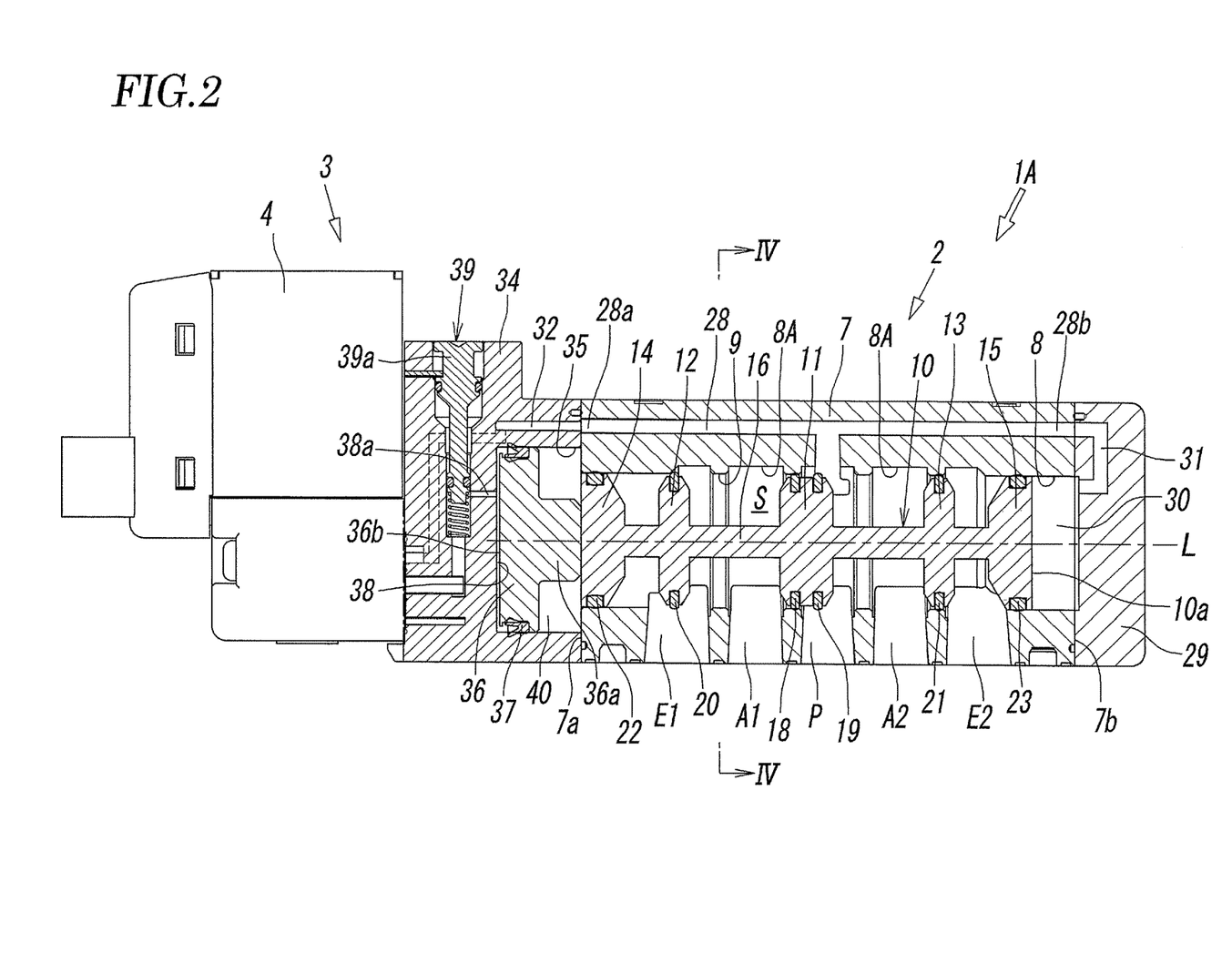
FIG. 2 is a longitudinal sectional view of the spool valve of the first embodiment in an assembled state taken along the axis of the valve hole.

A spool 10 that opens and closes flow paths connecting the adjacent ports is slidably inserted in the valve hole 8 in the direction of the axis L of the valve hole 8. The spool 10 has a first land portion 11 located at the center in the direction of the axis L, a second land portion 12 and a third land portion 13 located on both sides of the first land portion 11, a fourth land portion 14 and a fifth land portion 15 located on the outer side of the second land portion 12 and the third land portion 13, respectively, and shaft portions 16 connecting adjacent land portions with each other. The shaft portions 16 have a smaller diameter than the land portions 11 to 15. Further, the land portions 11 to 15 and the shaft portions 16 may be formed integrally with each other, or may be formed separately and connected to each other.

A first seal member 18 that opens and closes a flow path connecting the input port P and the first output port A by riding on the valve seat portions 9 formed in parts of the valve hole 8 and separating from the valve seat portions 9, and a second seal member 19 that opens and closes a flow path connecting the input port P and the second output port A2 in the same manner are fitted in recessed grooves in the outer periphery of the first land portion 11. A third seal member 19 that opens and closes a flow path connecting the first output port A1 and the first discharge port E1 in the same manner is fitted in a recessed groove in the outer periphery of the second land portion 12. A fourth seal member 21 that opens and closes a flow path connecting the second output port A2 and the second discharge port E2 in the same manner is fitted in a recessed groove in the outer periphery of the third land portion 13. A fifth seal member 22 that normally closes the hole end on the first end side of the valve hole 8 is fitted in a recessed groove in the outer periphery of the fourth land portion 14. A sixth seal member 23 that normally closes the hole end on the second end side of the valve hole 8 is fitted in a recessed groove in the outer periphery of the fifth land portion 15.

The first to fourth seal members 18 to 21 are formed of packings having a cross-sectional shape elongated in the radial direction of the seal members, and the fifth seal member 22 and the sixth seal member 23 are formed of O-rings.

The cross-sectional shapes of the first to fifth land portions 11 to 15 in the direction perpendicular to the axis L have the same shape and size as each other, and also have substantially the same shape and size as the cross-sectional shape of the valve hole 8, so the specific shape thereof will be described representatively for the first land portion 11 shown in FIG. 4.

That is, the cross-sectional shape of the land portion 11 is a track shape elongated in the height direction of the housing 7, and has a long axis X oriented in the height direction of the housing 7 and a short axis oriented in the width direction of the housing 7. The land portion 11 has left and right land side walls 25a, 25a that linearly extend in the long axis X direction and are parallel to each other, an upper first land end wall 25b that connects one ends of the left and right land side walls 25a, 25a, and a lower second land end wall 25c that connects the other ends of the left and right land side walls 25a, 25a. The first land end wall 25b and the second land end wall 25c each have a semicircular shape, and their respective curvature radii are equal to each other.

The diameter of the land portion 11 in the long axis X direction is equal to the diameter x of the valve hole 8 in the long axis X direction, and the diameter of the land portion 11 in the short axis Y direction is equal to the diameter y of the valve hole 8 in the short axis Y direction. The lengths of the left and right land side walls 25a, 25a of the land portion 11 are equal to each other, and equal to the length t of the left and right hole side walls 8a, 8a of the valve hole 8. Furthermore, the curvature radii of the first land end wall 25b and the second land end wall 25c of the land portion 11 are equal to each other, and equal to the curvature radii r of the first hole end wall 8b and the second hole end wall 8c of the valve hole 8.

The diameter x in the long axis direction X and the diameter y in the short axis direction Y of the land portion 11 are diameters (seal diameters) at the position of the seal member 18 or 19 in contact with the inner surface of the valve hole 8.

In the illustrated example, the length t of the left and right land side walls 25a, 25a in the long axis X direction is formed to be smaller than the diameter y in the direction of the short axis Y, but as with the valve hole 8, the length t can be formed to be equal to or larger than the diameter y in the short axis Y direction.

The first land portion 11 of the spool 10 may be divided into a portion to which the first seal member 18 is attached and a portion to which the second seal member 19 is attached.

Since, of the plurality of land portions 11 to 15, the fourth and fifth land portions 14 and 15 normally close the hole ends of the valve hole 8, and do not open and close flow paths, in the following description, when it is unnecessary to describe the fourth and fifth land portions 14 and 15, only the first to third land portions 11 to 13 are described, and description of the land portions 14 and 15 may be omitted.

On the other hand, the cross-sectional shape of the shaft portions 16 connecting the adjacent land portions 11 to 13 in a direction perpendicular to the axis L is circular. The diameter d of the shaft portions 16 may be smaller than the diameter y of the land portions 11 to 13 in the short axis Y direction, but is preferably ⅔ or less of the diameter y, and more preferably ½. In the illustrated example, it is formed to be about ⅓ of the diameter y.

A pilot supply hole 28 communicating with the input port P is formed in the housing 7 in parallel with the valve hole 8, a first end 28a of the pilot supply hole 28 opens at a first end 7a that is one end in the longitudinal direction of the housing 7, and a second end 28b of the pilot supply hole 28 opens at a second end 7b that is the opposite end in the longitudinal direction of the housing 7.

The pilot valve portion 3, which applies a propulsive force in one direction and a return force in the opposite direction due to pilot air to the spool 10, is provided at the first end 7a of the housing 7, and an end block 29 is attached to the second end 7b of the housing 7.

A pressure chamber 30 for return that the pressure receiving surface 10a at one end of the spool 10 faces and a communication hole 31 that connects the pressure chamber 30 for return and the second end 28b of the pilot supply hole 28 are formed in the end block 29, and pilot air is always supplied from the input port P to the pressure chamber 30 for return through the communication hole 31 and the pilot supply hole 28. A spring for return may be provided in the pressure chamber 30 to assist the return force due to the pilot air.

On the other hand, the pilot valve portion 3 has a piston box 34 connected to the housing 7, and the pilot valve 4 which is of electromagnetic type and connected to the piston box 34.

A piston chamber 35 communicating with an end portion of the valve hole 8 is formed in the piston box 34. In the piston chamber 35, a pilot piston 36 that applies propulsive force to the spool 10 is accommodated slidably in the direction of the axis L. A piston shaft 36a fitted in the valve hole 8 is formed on a surface of the pilot piston 36 that faces the spool 10, and the tip of the piston shaft 36a is in contact with the end surface of the spool 10.

A piston packing 37 that seals between the outer periphery of the pilot piston 36 and the inner periphery of the piston chamber 35 is attached to the outer periphery of the pilot piston 36. A pressure chamber 38 for propulsion is defined on one side the pilot piston 36 by the pilot piston 36 and the piston packing 37. The pressure chamber 38 for propulsion communicates through the pilot supply/discharge hole 38a, the manual operation portion 39, the pilot valve 4, and the communication hole 32 with the first end 28a of the pilot supply hole 28. By operating the manual operating portion 39 or the pilot valve 4, pilot air is supplied to and discharged from the pressure chamber 38 for propulsion through the input port P.

The piston packing 37 is a lip type piston packing having a directionality in the seal, and the lip of the piston packing 37 is directed toward the pressure chamber 38 side.

An open chamber 40 formed between the back surface of the pilot piston 36 and the spool 10 is open to the atmosphere.

The cross-sectional shapes of the piston chamber 35 and the pilot piston 36 in a direction perpendicular to the axis L are identical to each other and have a track shape elongated in the height direction of the housing 7. Describing the pilot piston 36, the pilot piston 36 has an elongated cross-sectional shape having a long axis X oriented in the height direction of the housing 7 and a short axis Y oriented in the width direction of the housing 7, and has left and right piston side walls 41a, 41a that form straight lines in the long axis X direction and are parallel to each other, an upper first piston end wall 41b that connects one ends of the left and right piston side walls 41a, 41a, and a lower second piston end wall 41c that connects the other ends of the left and right piston side walls 41a, 41a. The first piston end wall 41b and the second piston end wall 41c each have a semicircular shape, and their respective curvature radii are equal to each other.

The diameter yp of the pilot piston 36 in the short axis Y direction is equal to the diameter y of the land portions 11 to 15 of the spool 10 in the short axis Y direction, and the diameter xp of the pilot piston 36 in the long axis X direction is larger than the diameter x of the land portions 11 to 15 in the long axis X direction. Therefore, the cross-sectional area of the pilot piston 36 is larger than the cross-sectional area of the land portions 11 to 15 of the spool 10, and therefore the pressure receiving area of the pressure receiving surface 36b of the pilot piston 36 is larger than the pressure receiving area of the pressure receiving surface 10a of the end surface of the land portion 15 of the spool 10.

The diameter xp in the long axis X direction and the diameter yp in the short axis Y direction of the pilot piston 3 are the diameters (seal diameters) at the position of the piston packing 37 in contact with the inner surface of the piston chamber 35, and are equal to the diameter in the long axis X direction and the diameter in the short axis Y direction of the piston chamber 35.

As with the pilot piston 36, the piston shaft 36a also has a cross-sectional shape elongated in the height direction of the housing 7, but the piston shaft 36a may have any shape and size as long as it can freely enter and leave the valve hole 8.

The pilot valve 4 is a three-port electromagnetic valve, and is configured such that when the pilot valve 4 is energized, pilot air is supplied to the pressure chamber 38 for propulsion through the pilot valve 4, from the input port P, through the pilot supply/discharge hole 38a, and when the pilot valve 4 is de-energized, the pilot air is discharged to the atmosphere from the pressure chamber 38 for propulsion through the pilot valve 4.

The manual operation portion 39 realizes the same operating state as when the pilot valve 4 is energized by a manual operation of the operating element 39a at the time of power outage, maintenance, or the like. Since the configuration and operation thereof are well known, the description here will be omitted.

In the spool valve 1A having the above configuration, FIG. 2 shows a switching state when the pilot valve 4 is off. At this time, since the pilot air in the pressure chamber 38 for propulsion is discharged by the pilot valve 4 and the pressure chamber 30 for return is supplied with pilot air, the spool 10 and the pilot piston 36 are moved to the return position by the pilot air acting on the pressure receiving surface 10a of the spool 10. Therefore, the first seal member 18 of the first land portion 11 closes the flow path connecting the input port P and the first output port A1, the fourth seal member 21 of the third land portion 13 closes the flow path connecting the second output port A2 and the second discharge port E2, the input port P and the second output port A2 communicate with each other, and the first output port A1 and the first discharge port E1 communicate with each other.

From this state, when the pilot valve 4 is turned on, pilot air is supplied to the pressure chamber 38 for propulsion by the pilot valve 4, and this pilot air acts on the pressure receiving surface 36b of the pilot piston 36 and presses the pilot piston 36 toward the right side in the figure. Therefore, the pilot piston 36 is moved forward by an acting force based on the area difference between the pressure receiving surface 36b and the pressure receiving surface 10a of the spool 10, and displaces the spool 10 to the advanced position. Therefore, the second seal member 19 of the first land portion 11 closes the flow path connecting the input port P and the second output port A2, the third seal member 20 of the second land portion 12 closes the flow path connecting the first output port A1 and the first discharge port E1, the input port P and the first output port A1 communicate with each other, and the second output port A2 and the second discharge port E2 communicate with each other.

In the spool valve 1A having the above-described configuration, the cross-sectional shapes of the valve hole 8 and the land portions 11 to 15 of the spool 10 are elongated. Therefore, as compared with a known spool valve 60 shown in FIGS. 10 and 11 whose valve hole 62 and spool 63 have a circular cross-sectional shape, the cross-sectional area of the valve hole 8 can be increased without increasing the lateral width of the spool valve, that is, the valve width. Thereby, the cross-sectional area S of the flow paths formed between the inner periphery of the valve hole 8 and the outer peripheries of the shaft portions 16 of the spool 10 (the cross-sectional area of the flow paths around the shaft portions) S is increased, and the effective cross-sectional area of the entire flow path is greatly and efficiently increased.

That is, in the well-known spool valve 60, when the diameter of the valve hole 62 is y (=2r) and the diameter of the shaft portions 66 of the spool 63 is d, the sectional area S0 of the flow paths around the shaft portions 66 is $\pi \times (y^2 - d^2)/4$.

On the other hand, in the spool valve 1A of the present invention shown in FIGS. 1 to 4, the cross-sectional area S of the flow paths around the shaft portions 16 of the spool 10 is $(\pi \times (y^2 - d^2)/4) + (t \times y)$, which is larger than the cross-sectional area S0 of the known spool valve 60 by $t \times y$.

In the present invention, the cross-sectional shape of the shaft portions 16 may be the same elongated shape as that of the land portion 11 as indicated by a chain line in FIG. 4. In this case, since the length in the long axis X direction of the left and right shaft side walls 16a, which form straight lines, of the shaft portions 16 is t, the diameter in the short axis Y direction of the shaft portions 16 is d, and the curvature radius of the first axial end wall 16b and the second axial end wall 16c is d/2, the cross-sectional area S of the flow paths around the shaft portions of the spool 10 is $(\pi \times (y^2 - d^2)/4) + (t \times (y - d))$, and is larger than the cross-sectional area S0 of the known spool valve 60 by $t \times (y - d)$.

It is also conceivable to make the cross-sectional shape of the valve hole 8 and the land portions 11 to 15 elliptical. However, the elliptical valve hole and land portions are difficult to process because it is difficult to obtain precision. In addition, for example, in the case of forming an elliptical valve hole having the same cross-sectional area as the valve hole 8 of the present invention, when the diameters y in the short axis Y direction of both valve holes are the same, the diameter in the X axis direction of the elliptical valve hole is larger than the diameter x in the X axis direction of the valve hole 8 of the present invention, and therefore it is inefficient compared with the present invention.

In the present invention, the cross-sectional shape of the pilot piston 36 in the pilot valve portion 3 is an elongated shape similar to that of the land portions 11 to 15 of the spool 10. The diameter xp in the long axis X direction thereof is larger than the diameter x in the long axis X direction of the land portions 11 to 15 of the spool 10, but the diameter yp in the short axis Y direction of the pilot piston 36 is the same as the diameter y in the short axis Y direction of the land portions 11 to 15. Therefore, the lateral width of the piston box 34, that is, the lateral width of the spool valve 1A is not increased.

Figure 5:
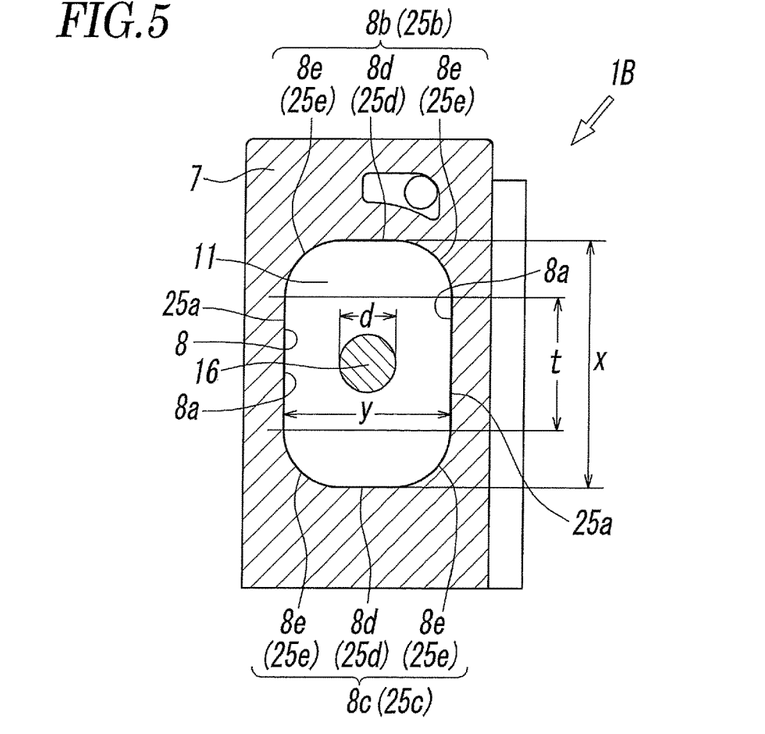
FIG. 5 is a cross-sectional view of a main part showing the cross-sectional shape of the valve hole and the spool of the spool valve of the second embodiment.
Figure 6:
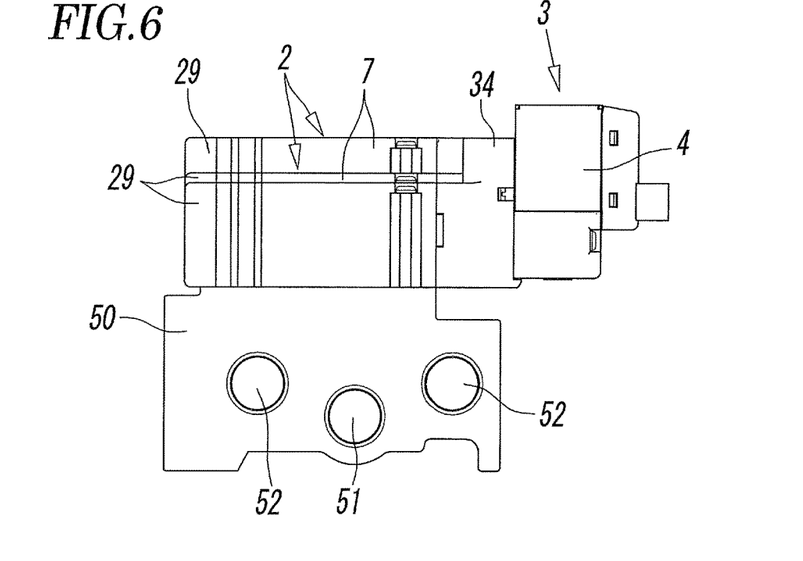
FIG. 6 is a side view of a manifold valve formed by mounting the spool valve of the present invention on a manifold.
Figure 7:
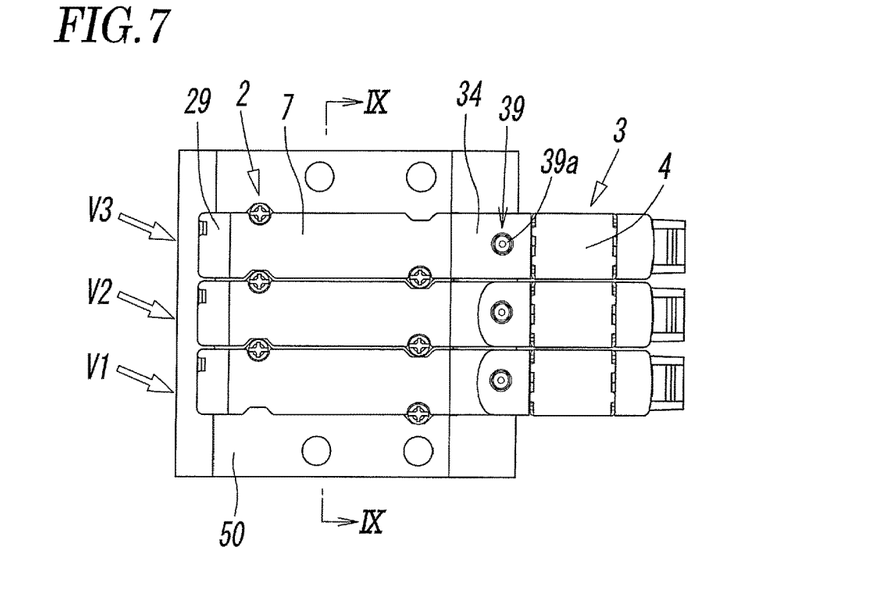
FIG. 7 is a plan view of FIG. 6.
Figure 8:
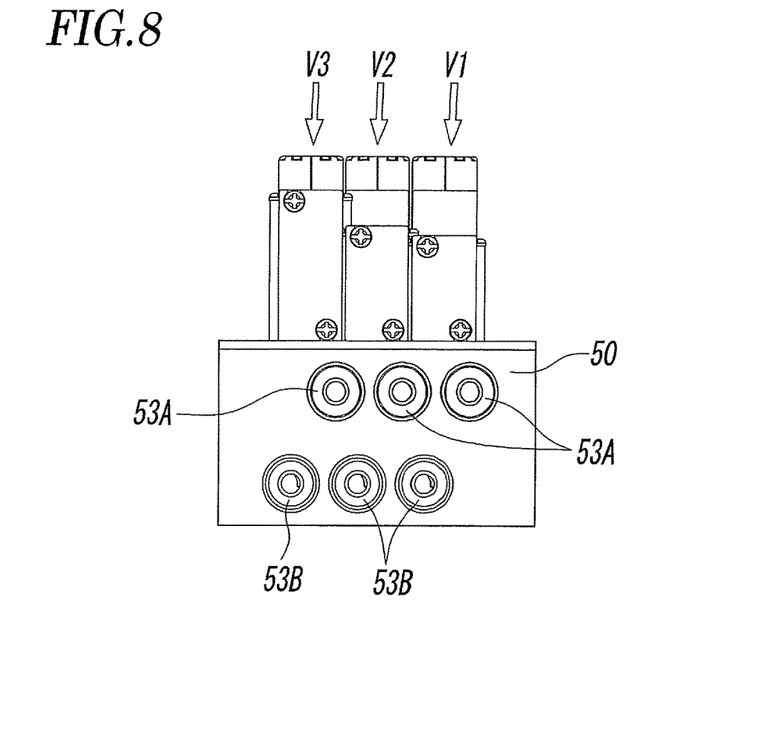
FIG. 8 is a left side view of FIG. 6.

FIG. 5 is a cross-sectional view showing a main part of the spool valve 1B according to a second embodiment. The spool valve 1B of the second embodiment is different from the spool valve 1A of the first embodiment in that the first hole end wall 8b and the second hole end wall 8c of the valve hole 8 and the first land end wall 25b and the second land end wall 25c of each of the land portions 11 to 15 of the spool 10 are not semicircular.

That is, the first hole end wall 8b and the second hole end wall 8c of the valve hole 8 have a straight portion 8d perpendicular to the hole side walls 8a, and arcuate corner portions 8e that smoothly connect both ends of the straight portion 8d to ends of the left and right hole side walls 8a, and the first land end wall 25b and the second land end wall 25c of the land portions 11 to 15 have a straight portion 25d perpendicular to the land side walls 25a, and arcuate corner portions 25e that smoothly connects both ends of the straight portion 25d to ends of the left and right land side walls 25a.

By forming the straight portions 8d and 25d in the first hole end wall 8b and the second hole end wall 8c of the valve hole 8 and the first land end wall 25b and the second land end wall 25c of the land portions 11 to 15 as in the spool valve 1B of the second embodiment, the cross-sectional area of the valve hole 8 can be further increased as compared with the spool valve 1A of the first embodiment in which the first hole end wall 8b and the second hole end wall 8c of the valve hole 8 and the first land end wall 25b and the second land end wall 25c of the land portions 11 to 15 are each formed in a semicircular shape, when both spool valves have equal diameters x in the long axis X direction and the equal diameters y in the short axis Y direction.

In the spool valve 1B of the second embodiment, a pilot piston (not shown) also has a vertically elongated shape similar to the valve hole 8 and the land portions 11 to 15. The diameter in the long axis direction thereof is larger than the diameter x of the valve hole 8 and the land portions 11 to 15 in the long axis X direction, but the diameter in the short axis direction is the same as the diameter y of the valve hole 8 and the land portions 11 to 15 in the short axis Y direction.

The configuration of the spool valve 1B of the second embodiment other than the above-described configuration is substantially the same as that of the spool valve 1A of the first embodiment.

FIGS. 6 to 9 show a manifold valve formed by mounting a plurality of (three in the figure) spool valves V1, V2, and V3 on one unit-type manifold 50.

In this manifold valve, the manifold 50 includes a common air supply hole 51 that supplies compressed air to the plurality of spool valves V1, V2, and V3, a common discharge hole 52 that discharges the compressed air discharged from the plurality of spool valves V1, V2, and V3 to the outside, and the same number of sets of two output holes 53A and 53B communicating with two output ports of each of the spool valves V1, V2, and V3 as the number of the spool valves V1, V2, and V3.

The air supply hole 51 and the discharge hole 52 are formed so as to extend in the longitudinal direction of the manifold 50, and the output holes 53A and 53B are formed at positions corresponding to the respective spool valves V1, V2, and V3 in the side surface of the manifold 50.

Figure 9:
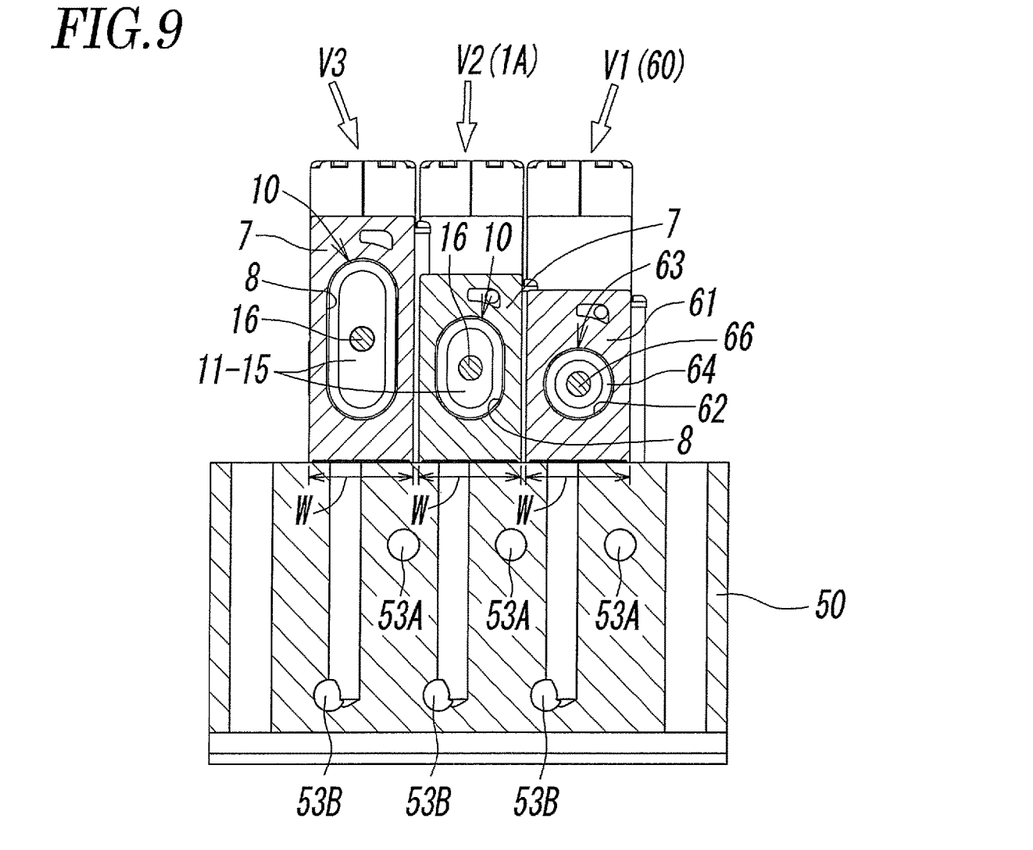
FIG. 9 is an enlarged sectional view taken along line IX-IX of FIG. 7.

As is apparent from FIG. 9, of the three spool valves V1, V2, and V3, the first spool valve V1 located at the rightmost position is the above-described known spool valve 60 whose valve hole and spool have a circular cross-sectional shape, and the other second and third spool valves V2 and V3 are spool valves according to the present invention whose valve hole 8 and spool 10 have an elongated cross-sectional shape.

Of the second and third spool valves V2 and V3 according to the present invention, the second spool valve V2 located at the center of FIG. 9 is the spool valve 1A of the first embodiment. As is apparent from FIG. 4, the length t of the left and right land side walls 25d, 25d of the land portions 11 to 15 of the spool 10 is smaller than the diameter y of the land portions 11 to 13 in the short axis Y direction. On the other hand, in the third spool valve V3 located at the left end in FIG. 9, the length t of the left and right land side walls 25d, 25d is larger than the diameter y in the short axis Y direction.

Therefore, when comparing the heights of the housings 7, 61 of the three spool valves V1, V2, and V3, the housing 7 of the first spool valve V1 is the lowest, the housing 7 of the third spool valve V3 is the highest, and the housing 7 of the second spool valve V2 is intermediate in height between them. However, the heights of the spool valves including the pilot valve portions 3 and 67 are equal to each other. The valve widths W of the three spool valves V1, V2, and V3 are equal to each other.

As described above, although in the spool valves V2 and V3 according to the present invention, the cross-sectional shape of the valve hole 8 and the spool 10 is enlarged as compared with the known spool valve V1 (60) whose valve hole 62 and spool 63 have a circular cross-sectional shape, the same valve width as the known spool valve 60 can be maintained. Therefore, the spool valves V2 and V3 according to the present invention can be mounted on the conventional manifold 50 on which the known spool valve 60 can be mounted, together with the known spool valve 60.

It is also possible to mount only the spool valves V2 and V3 of the present invention on the manifold 50.

The spool valves 1A and 1B of the above embodiments are single-pilot type spool valves having one pilot valve 4, but the spool valves 1A and 1B of the present invention may be double-pilot type spool valves having two pilot valves 4. This double pilot type spool valve can be obtained by, in the spool valve 1A of the first embodiment shown in FIG. 2, providing the pilot valve portion 3 with a second pilot valve and a second manual operation portion that are different from the pilot valve 4 and the manual operation portion 39, and causing the output port of the second pilot valve to communicate with the pressure chamber 30 for return through the second manual operation portion and a pilot path extending inside the housing 7 and the end block 29. By alternately turning on and off the two pilot valves and alternately supplying and discharging pilot air to and from the pressure chamber 38 for propulsion and the pressure chamber 30 for return, the spool 10 is switched to the propulsion position and the return position.

The second pilot valve and the second manual operation portion newly provided may be provided on the end block 29 side instead of being provided in the pilot valve portion 3.

Further, when the spool valve 1A of FIG. 2 is of the double pilot type as described above, a pilot piston for return may be provided in the end block 29, and the spool 10 may be returned by the pilot piston for return. In this case, the shape of the pilot piston for return is formed in an elongated shape similar to that of the pilot piston 36 for propulsion, and the pressure receiving area may be the same as or smaller than the pressure receiving area of the pilot piston 36.

In the spool valve 1A according to the first embodiment, it is also possible to provide a pilot piston for return in the end block 29, and to return the spool 10 by the pilot piston for return. In this case, the pilot piston for return is formed in an elongated shape similar to the pilot piston 36 for propulsion, and its size, that is, the pressure receiving area is smaller than the pressure receiving area of the pilot piston 36 for propulsion, and substantially the same size as the pressure receiving area of the pressure receiving surface 10a of the spool 10.

In the spool valve of the above embodiment, seal members 18 to 23 that are elastic bodies made of rubber, synthetic resin, or the like are attached to the outer peripheries of the land portions 11 to 15 of the spool 10, but the present invention can also be applied to a metal seal type spool valve in which such seal members are not attached to the outer peripheries of the land portions.

Although each of the illustrated embodiments is a five-port type spool valve, the present invention can also be applied to a spool valve having another number of ports such as a three-port type or a four-port type.

REFERENCE SIGNS LIST 1A, 1B, V1, V2, V3 spool valve
2 main valve portion
3 pilot valve portion
4 pilot valve
7 housing
8 valve hole
8a hole side wall
8b first hole end wall
8c second hole end wall
8d straight portion
8e corner portion
10 spool
11, 12, 13, 14, 15 land portion
25a land side wall
25b first land end wall
25c second land end wall
25d straight portion
25e corner portion
36 pilot piston
41a piston side wall
41b first piston end wall
41c second piston end wall
P, A1, A2, E1, E2 port
L axis
X long axis
Y short axis
x, xp diameter in long axis direction
y, yp diameter in short axis direction
d diameter of shaft portion
t length
W valve width

The invention claimed is:

1. A spool valve comprising:
a main valve portion including a housing having a length direction, a width direction, and a height direction, a valve hole extending inside the housing in the length direction of the housing, ports for input, output, and discharge formed in the housing so as to communicate with the valve hole, and a spool slidably inserted in the valve hole in the direction of an axis of the valve hole; and
a pilot valve portion that applies a propulsive force in one direction and a return force in the opposite direction due to pilot fluid applied to the spool,
wherein the cross-sectional shape of the valve hole in a direction perpendicular to the axis is an elongated shape having a long axis oriented in the height direction of the housing and a short axis oriented in the width direction of the housing, and has left and right hole side walls that linearly extend in the long axis direction of the valve hole and are parallel to each other, a first hole end wall that connects one ends of the left and right hole side walls, and a second hole end wall that connects the other ends of the left and right hole side walls, and
wherein the spool has land portions that open and close flow paths, and shaft portions connecting adjacent land portions with each other and having a diameter smaller than the land portions, and the cross-sectional shape of the land portions in a direction perpendicular to the axis is an elongated shape having a long axis oriented in the height direction of the housing and a short axis oriented in the width direction of the housing, is the same shape and size as the cross-sectional shape of the valve hole, and has left and right land side walls that linearly extend in the long axis direction of the land portions and are parallel to each other, a first land end wall that connects one ends of the left and right land side walls, and a second land end wall that connects the other ends of the left and right land side walls.

2. The spool valve according to claim 1,
wherein the pilot valve portion has a pilot piston that applies propulsive force to the spool and an electromagnetic pilot valve that causes a pilot fluid to act on the pilot piston, and
wherein the cross-sectional shape of the pilot piston in a direction perpendicular to the axis is an elongated shape having a long axis oriented in the height direction of the housing and a short axis oriented in the width direction of the housing, and has left and right piston side walls that linearly extend in the long axis direction of the pilot piston and are parallel to each other, a first piston end wall that connects one ends of the left and right piston side walls, and a second piston end wall that connects the other ends of the left and right piston side walls.

3. The spool valve according to claim 2, wherein the diameter in the long axis direction of the pilot piston is larger than the diameter in the long axis direction of the land portions of the spool, and the diameter in the short axis direction of the pilot piston is equal to the diameter in the short axis direction of the land portions.

4. The spool valve according to claim 1, wherein the cross-sectional shape of the shaft portions in a direction perpendicular to the axis is a circular shape or an elongated shape having a long axis oriented in the height direction of the housing and a short axis oriented in the width direction of the housing.

5. The spool valve according to claim 1, wherein the first hole end wall and the second hole end wall of the valve hole and the first land end wall and the second land end wall of the land portions each have a semicircular shape, and their respective curvature radii are equal to each other.

6. The spool valve according to claim 1, wherein the first hole end wall and the second hole end wall of the valve hole and the first land end wall and the second land end wall of the land portions are composed of a straight portion perpendicular to the hole side walls of the valve hole and the land side walls of the land portions and circular arc-shaped corner portions that smoothly connect the straight portion to ends of the hole side walls and the land side walls.

7. A manifold valve in which a plurality of spool valves having the same valve width are mounted on one manifold, wherein at least one of the plurality of spool valves comprises
a main valve portion including a housing having a length direction, a width direction, and a height direction, a valve hole extending inside the housing in the length direction of the housing, ports for input, output, and discharge formed in the housing so as to communicate with the valve hole, and a spool slidably inserted in the valve hole in the direction of an axis of the valve hole; and
a pilot valve portion that applies a propulsive force in one direction and a return force in the opposite direction due to pilot fluid applied to the spool,
wherein the cross-sectional shape of the valve hole in a direction perpendicular to the axis is an elongated shape having a long axis oriented in the height direction of the housing and a short axis oriented in the width direction of the housing, and has left and right hole side walls that linearly extend in the long axis direction of the valve hole and are parallel to each other, a first hole end wall that connects one ends of the left and right hole side walls, and a second hole end wall that connects the other ends of the left and right hole side walls, and
wherein the spool has land portions that open and close flow paths, and shaft portions connecting adjacent land portions with each other and having a diameter smaller than the land portions, and the cross-sectional shape of the land portions in a direction perpendicular to the axis is an elongated shape having a long axis oriented in the height direction of the housing and a short axis oriented in the width direction of the housing, is the same shape and size as the cross-sectional shape of the valve hole, and has left and right land side walls that linearly extend in the long axis direction of the land portions and are parallel to each other, a first land end wall that connects one ends of the left and right land side walls, and a second land end wall that connects the other ends of the left and right land side walls.

8. The manifold valve according to claim 7,
wherein the pilot valve portion has a pilot piston that applies propulsive force to the spool and an electromagnetic pilot valve that causes a pilot fluid to act on the pilot piston, and
wherein the cross-sectional shape of the pilot piston in a direction perpendicular to the axis is an elongated shape having a long axis oriented in the height direction of the housing and a short axis oriented in the width direction of the housing, and has left and right piston side walls that linearly extend in the long axis direction of the pilot piston and are parallel to each other, a first piston end wall that connects one ends of the left and right piston side walls, and a second piston end wall that connects the other ends of the left and right piston side walls.

9. The manifold valve according to claim 8, wherein the diameter in the long axis direction of the pilot piston is larger than the diameter in the long axis direction of the land portions of the spool, and the diameter in the short axis direction of the pilot piston is equal to the diameter in the short axis direction of the land portions.

10. The manifold valve according to claim 7, wherein the cross-sectional shape of the shaft portions in a direction perpendicular to the axis is a circular shape or an elongated shape having a long axis oriented in the height direction of the housing and a short axis oriented in the width direction of the housing.

11. The manifold valve according to claim 7, wherein the first hole end wall and the second hole end wall of the valve hole and the first land end wall and the second land end wall of the land portions each have a semicircular shape, and their respective curvature radii are equal to each other.

12. The manifold valve according to claim 7, wherein the first hole end wall and the second hole end wall of the valve hole and the first land end wall and the second land end wall of the land portions are composed of a straight portion perpendicular to the hole side walls of the valve hole and the land side walls of the land portions and circular arc-shaped corner portions that smoothly connect the straight portion to ends of the hole side walls and the land side walls.

* * * * *